United States Patent [19]

Denker

[11] Patent Number: 5,378,304
[45] Date of Patent: Jan. 3, 1995

[54] SEALING MACHINE HAVING GAP CONTROL BETWEEN HEAT SEAL COMPONENTS

[75] Inventor: Stanley D. Denker, New Richmond, Wis.

[73] Assignee: Doboy Packaging Machinery, Inc., New Richmond, Wis.

[21] Appl. No.: 163,513

[22] Filed: Dec. 9, 1993

[51] Int. Cl.⁶ .................. B30B 5/06; B30B 15/34
[52] U.S. Cl. .................. 156/555; 156/583.1; 156/583.5; 100/93 RP; 100/154; 425/371
[58] Field of Search .............. 156/555, 582, 583.1, 156/583.5; 100/93 RP, 151, 154; 425/371

[56] References Cited

U.S. PATENT DOCUMENTS

| | | | |
|---|---|---|---|
| 2,818,904 | 1/1958 | Ambrose | 156/555 |
| 3,657,055 | 4/1972 | Nichols | 156/583.4 |
| 3,729,357 | 4/1973 | Swartz | 156/553 |
| 3,737,359 | 6/1973 | Levitan | 156/522 |
| 3,767,510 | 10/1973 | Gustafson | 156/494 |
| 3,775,225 | 11/1973 | Schott, Jr. | 156/510 |
| 4,004,963 | 1/1977 | Denker | 156/583.5 |
| 4,016,026 | 4/1977 | Grevich | 156/583.5 X |
| 4,080,241 | 3/1978 | Grevich et al. | 156/583.5 X |
| 4,202,721 | 5/1980 | Roberts | 156/358 |
| 4,611,455 | 9/1986 | Aiuola et al. | 53/373 |
| 4,721,502 | 1/1988 | Herrington | 493/193 |
| 5,034,087 | 7/1991 | Denker et al. | 156/555 |

*Primary Examiner*—David A. Simmons
*Assistant Examiner*—J. Sells
*Attorney, Agent, or Firm*—Haugen and Nikolai

[57] ABSTRACT

A heat sealing machine for sealing layers of a plastic film to each other. The machine includes a pair of flexible, endless opposed heat transfer bands each fronting each other and having a gap therebetween wherein layers of plastic film travel for sealing. Heat sealing components such as heat sealing bars in communication with the heat transfer bands and disposed behind the heat transfer bands are provided with constraints for limiting the inwardly-lateral movement thereof to thereby restrict movement thereof such that a bar does not travel beyond the longitudinal mid-line of the gap. In this manner, varying thicknesses of layers of plastic to be sealed can be accommodated without misalignment and jamming.

5 Claims, 3 Drawing Sheets

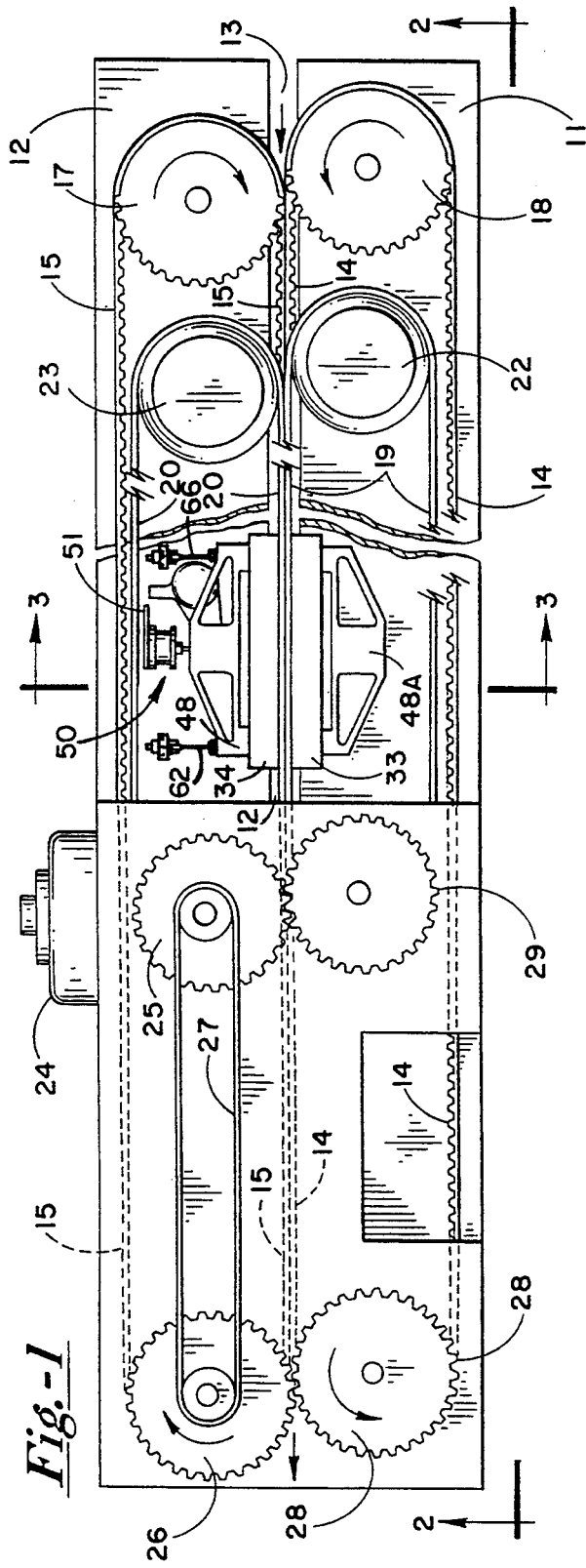
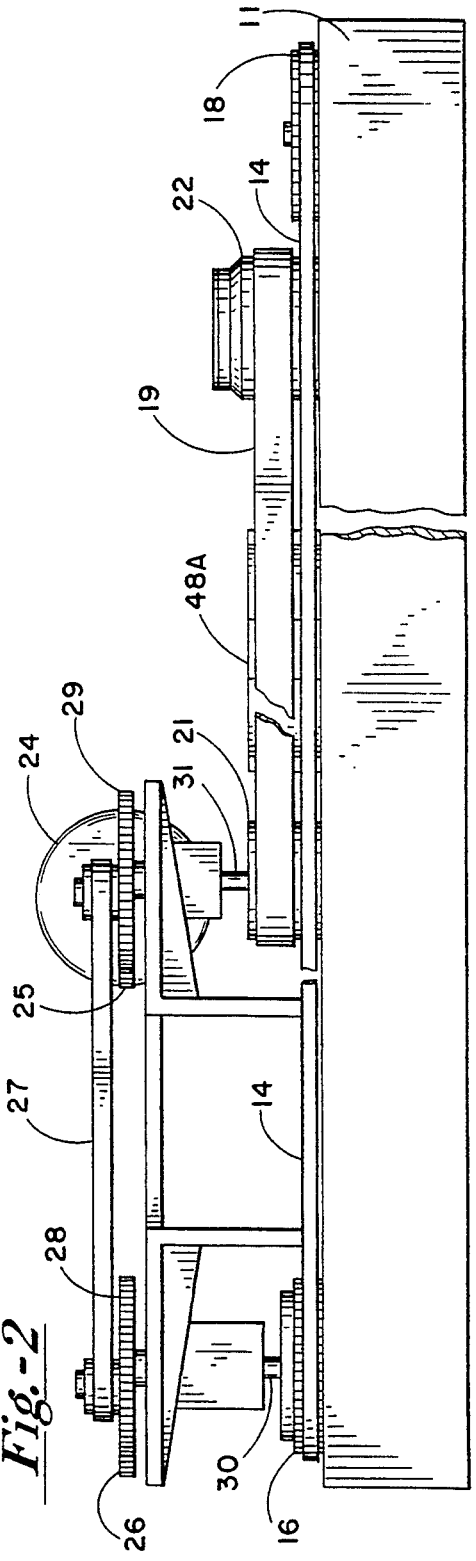
Fig.-1
Fig.-2

SEALING MACHINE HAVING GAP CONTROL BETWEEN HEAT SEAL COMPONENTS

BACKGROUND OF THE INVENTION

The present invention relates generally to heat sealing machines for closing and sealing packaging made from a heat-sealable film such as polyethylene, and in particular to means for the maintenance of a minimum gap between two opposing heat transfer components such as heat sealing bars between which layers of film to be sealed travel.

Sealing machines of the class to which the present invention generally pertains employ a pair of continuous bands, made of steel, fiberglass or other similar materials, which are arranged to travel in the same direction in confronting parallel relation with each other along a sealing run. The film layers of plastic material to be sealed together travel sequentially along the sealing run between the bands, and the seal is made by simultaneously applying heat and pressure to the layers as the layers travel between the bands along the sealing path. The material to be sealed is carried between a pair of continuous belts or chains also arranged to travel in the same direction in confronting parallel relation and at the speed of the sealing bands.

At least one pair of components such as bars or platens flanking the continuous bands apply heat and pressure to seal the layers through the bands. Such heater bars are normally mounted on the frame of the machine and have generally been stationary with respect to the frame of the machine, so that they remain close to the traveling bands while making allowance for the thickness of the film material to be sealed traveling therebetween. Ample room has had to be supplied so that the film material would not produce jamming of the machine in the event that wrinkles or multiple thicknesses were encountered during high speed operation.

More recently, the heater bars have been mounted on springs so that the entire heater bars are movable inwardly and outwardly a certain amount and apply a constant pressure against the moving bands, and thus the film material being heat sealed, so that the sealing is effectuated under spring loaded compression pressure. Allowance may then be made for the heater bars to separate a certain amount from each other and allow bands to separate or pivot slightly when wrinkled portions of film layers or other multiple thicknesses pass through the machine during sealing. One such system incorporating spring loaded heat transfer elements which continuously bear inward against the bands with a pressure device from springs is shown in U.S. Pat. No. 4,016,026.

In U.S. Pat. No. 5,034,087, commonly assigned with the present application and incorporated herein by reference, at least one heater bar of an opposing pair of bars is provided with a fluid-pressure adjustable, pivotable and spring-bias bar system which controls and modulates the maximum force applied to the bands between the bars in relation to the thickness or configuration of the layers to be sealed. In this manner varying thicknesses of materials can be easily accommodated.

In the prior art sealing apparatus, the movable heater bars move in an inward direction to thereby decrease the size of the gap between the sealing bands through which the material to be sealed travels. In certain instances, where material to be sealed is relatively thin, this laterally-inward bar movement may be of such a magnitude that the bar involved travels beyond the longitudinal mid-line of the gap. When this occurs, the material to be sealed can become misaligned, and jamming of material can result. This is also important when using glass cloth bands as they are not as strong and abrasion resistant as stainless steel bands. Contact between the heater bar and glass cloth bands results in rapid or premature wear of the bands. In view of this problem, it is apparent that a need exists for effective maintenance of inward travel distance of movable heater components.

It is therefore a primary object of the present invention to provide a sealing machine wherein the laterally-inward travel of movable heater components is controlled to prohibit such travel beyond the longitudinal mid-line of a gap disposed between opposing heater bars and sealing bands.

Another object of the present invention is to provide a sealing machine wherein laterally-inward travel of a movable heater component is limited by flexible control means attached to the bar such that the component can move laterally outwardly as well as inwardly, but not inwardly beyond the longitudinal mid-line of the gap.

These and other objects of the present invention will become apparent throughout the description which follows.

SUMMARY OF THE INVENTION

The present invention is a heat sealing machine for sealing layers of a plastic film to each other. The machine comprises a pair of flexible, endless opposed heat transfer bands each fronting each other and having a gap therebetween with a longitudinal mid-line. The bands travel together and transport layers of film through the gap for sealing therein. At least one pair of elongate oppositely disposed heat transfer components are disposed such that the members of each such pair face each other separated by confronting portions of the bands and co-extending therealong. Each heat transfer component has an elongate front face having a heat transfer surface positioned in a substantially vertical plane confronting a respective heat transfer band. Each pair of heat transfer components comprises a stationary component and an adjustable component, with the adjustable component having the ability to move both inwardly and outwardly laterally and pivotally in a substantially horizontal plane with respect to the corresponding stationary heat transfer component while maintaining the angular disposition of the heat transfer surface to thereby control the pressure of sealing and thickness accommodation of layers to be sealed. Means are provided for applying a controllable force to urge each adjustable heat transfer component of a pair toward and in alignment with the matching stationary heat transfer component, with the laterally inward movement of the adjustable component limited by constraint means such that the adjustable heat transfer component does not travel beyond the longitudinal mid-line of the gap disposed between the opposed sealing heat transfer bands. In the preferred embodiment each heat transfer component is a heat seal bar and the constraint means is a pair of flexible control means such as a pair of cables wherein one respective cable is attached to each end of the heater bar. Each cable can have a travel adjustment means for adjusting the inwardly-lateral movement of the adjustable heater bar by regulating the length of cable and thereby restricting heater bar movement beyond the mid-line of the gap.

BRIEF DESCRIPTION OF THE DRAWINGS

FIG. 1 is a partial top plan view, with parts broken away, showing a pair of heater bars mounted in a sealing machine in accordance with the present invention;

FIG. 2 is a side elevational view of the machine of FIG. 1;

DETAILED DESCRIPTION OF THE PREFERRED EMBODIMENT

Figure 3:
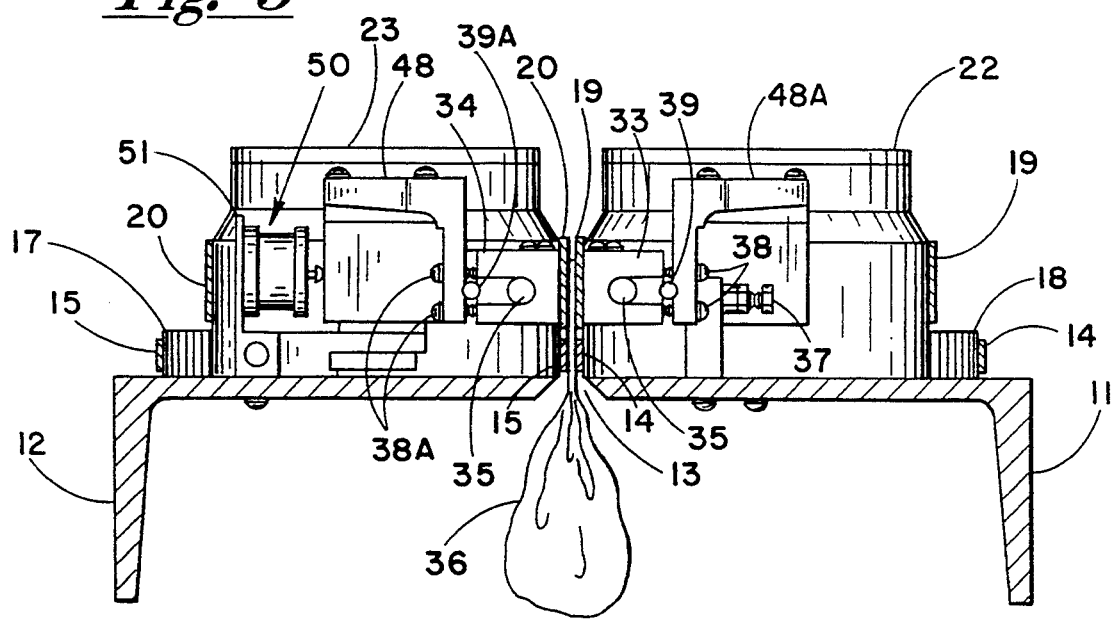
FIG. 3 is an enlarged detailed section view taken approximately at line 3—3 of FIG. 1.

A portion of a representative heat sealing machine in which the invention can be used is illustrated in FIGS. 1 and 2. Typically, such a device is mounted on a conventional transportable floor stand (not shown), but can be mounted in any appropriate manner in accord with the material to be sealed by the device and the requirements of the overall process. The sealing machine has undercarriage support or frame members 11 and 12 which define a slot 13 which extends throughout the entire length of the frame to permit the passage of film layers including the tops of bags to be closed.

The bags to be sealed will travel through the machine in the direction that is indicated by arrows in FIG. 1. Opposed conveyor belts as at 14 and 15 are carried on driven sprockets, one of which is shown as 16 in FIG. 2, and on idler sprockets 17, 18. The belts are suited for gripping bags below the top edge thereof and support and carry the bags or film layers through the machine in a well known manner. As shown at 36 in FIG. 3, the upper edge portion of the bag will pass between a pair of endless sealing heat transfer belts or bands 19, 20 which may be formed of stainless steel, for example, with a heat resistance slippery plastic coating on the faces thereof to prevent sticking of the bands to the film being sealed. Alternatively, the bands may be of fiberglass or other material which has the strength and temperature characteristics to serve the purpose. Thus, band 19 is mounted for travel around a pair of band wheels including a drive band wheel 21 and an idler band wheel 22, and band 20 likewise is trained around idler wheel 23 and a drive wheel not shown.

The drive system includes a motor 24 connected in conventional fashion to drive a drive gear 25 (FIG. 1) which is connected to a drive gear 26 by a drive belt 27. Gears 25, 26, in turn, drive gears 28, 29 at the same speed in the opposite direction. The top gears directly drive respective belt sprockets or band wheels through common axles as at 30 and 31. As is shown, the adjacent band wheels 22, 23 are not mounted directly opposite each other, but, instead, are slightly offset and, similarly, the other band wheels are not directly opposite each other, but are also slightly offset. The offset relationship permits the peripheries of the wheels or sprockets to bring the bands into closely spaced and substantially parallel relation with respect to each other to thereby allow adequate spacing between the peripheries of the wheels and thereby permit several thicknesses of film or films of varying thicknesses to be moved between the wheels.

Pairs of identical heater bars 33, 34 are disposed at opposite sides of the bands 19, 20 and confront the linear faces of the bands to effectively create a heating station. As shown in FIG. 3, each of the bars 33, 34 is provided with an elongated slot or opening which extends longitudinally throughout the length of the bar and which receives an electric heating element 35 for controlling the temperature of the heater bar. The heater bars 33, 34 are normally in the form of rectangular blocks and may be of copper, brass, carbon or other low friction, heat conducting materials which maximize heat transfer and minimize wear as the bands 19, 20 travel along the bars continuously. Each of the heat elements 35 can move in relation to the corresponding heater bar 33, 34. The heater bar 33 carried by member 48A is fixed in relation to the path of travel of the belts 19, 20, but can be horizontally aligned as by spaced alignment screw members 37 shown in FIGS. 3 and 4, and aligned in the vertical plane as by alignment screws 38 in conjunction with pivot member 39 (FIG. 3).

Figure 4:
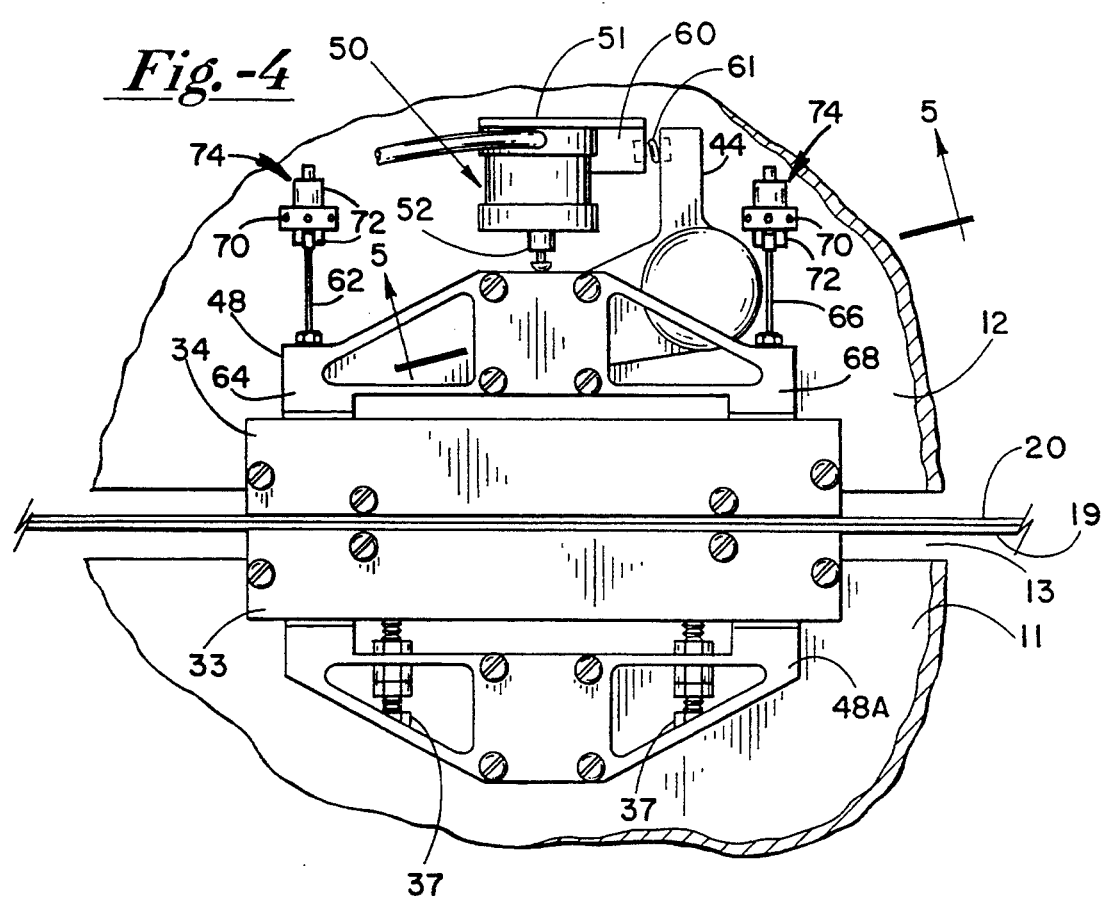
FIG. 4 is an enlarged detailed top plan view of the heater bar assembly.
Figure 5:
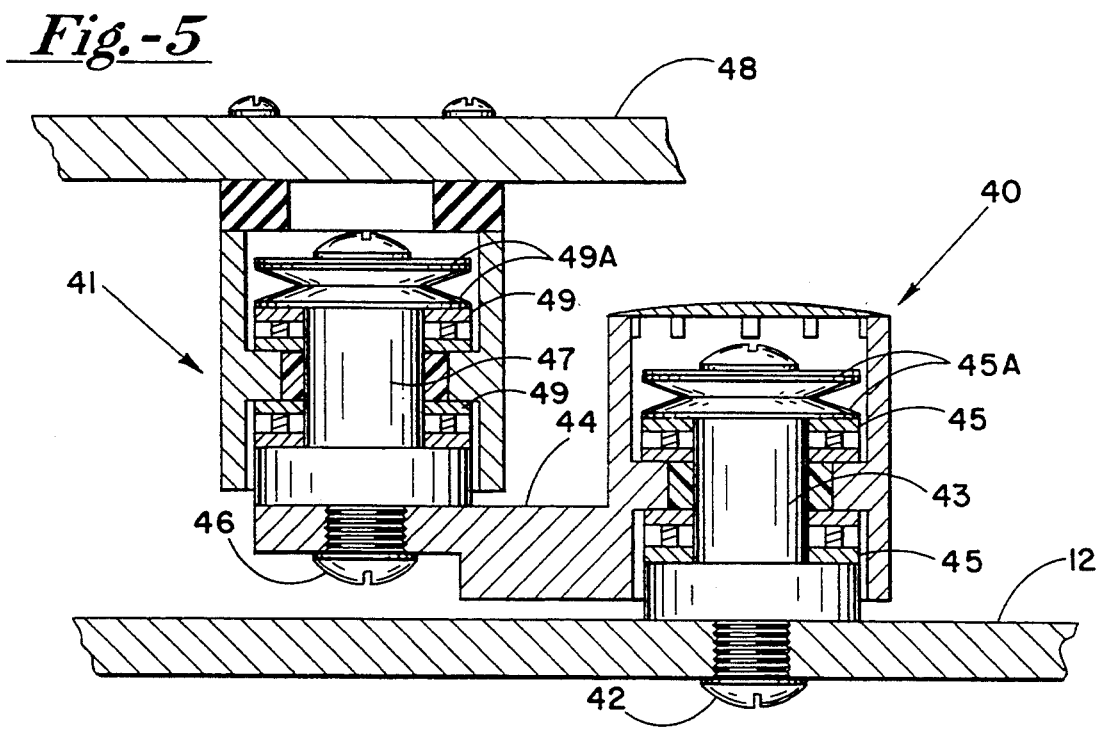
FIG. 5 is a detailed section view taken at approximately line 5—5 of FIG. 4.

As shown in FIG. 4, the movable heater bar 34 has one end of a first flexible, non-extensible member which is preferably a metal cable 62 threadably attached thereto near one end 64, and one end of a second such cable 66 threadably attached near its other end 68. The other respective ends of the cable 62, 66 are retained within respective adjusting nut assemblies 74 secured to the frame member 12 with respective U-shaped brackets 72. Each adjusting nut 70 is provided with regularly spaced detent depressions in a vertical face thereof and that are radially spaced such that rotation of the nut 70 from one detent depression to the next translates to a movement of the heater bar 34 a distance of 0.001 inch. Cooperating with the detent depressions is a sparingloaded ball (not shown) that is mounted in bracket 72 to provide a tactile and audible "click" as the nut is turned. Rotation of the nut 70 thereby permits regulation of the maximum inward movement available to the heater bar 34 as permitted by the cables 62, 66 to constrain the bar 34 from passing laterally inwardly beyond the longitudinal mid-line of the gap 13 between the bands 19, 20. Laterally-outward movement of the heater bar 34 is not restrained since the cables 62, 66 are flexible and therefore merely bend when laterally outward movement of the heater bar 34 occurs. Rotation of the nut 70 is facilitated by inserting a tool such as an Allen wrench into the radially spaced bores formed in the periphery of the nuts, The adjustable bar assembly is mounted and operates with respect to two distinctly spaced pivot assemblies 40, 41. Pivot 40 is fixed to the undercarriage or frame member 12 as at 42, and contains pivot pin 43 which carries yoke member 44, as by a set of thrust needle bearings 45 retained by conical spring thrust washers 45A. Pivot assembly 41 is fixed to the yoke member 44 as at 46 and includes pivot pin member 47 which carries structural member 48 as by another set of thrust needle bearings 49 retained by conical spring washers 49A. As shown in FIG. 3, the heater bar 34 is mounted from the member 48 and therefore is free to pivot horizontally about the pivot pin 47. The yoke in turn is free to pivot horizontally about the pivot pin 43. The adjustable bar 34 is provided with a means for alignment in the vertical plane as by adjustment screws 38A operating in conjunction with member 39A (FIG. 3).

As shown in FIGS. 3 and 4, an air operated cylinder 50 is mounted in fixed relation to the undercarriage or frame member 12 as by a mounting bracket 51. The fluid cylinder has push rod 52 which operates against the structure of the movable pivot assembly 41. A spring member 61 is provided between an extension of the member 44 and a bracket member mounted from the frame member 11 at 60. The compression spring 61 provides a force which tends to cause the yoke member 44 to rotate about pin 43 in a clockwise direction and is opposed by the force created by the operating rod 52 of the cylinder 50 which applies a force to the pin assembly 41 tending to cause rotating of the yoke member about pin member 43 in a counterclockwise direction. With respect to the heater bar 34, of course, the operation of the cylinder is such that it tends to cause the bar to move into the gap 13. The spring member 61 opposes this force. The mounting of the bar 34 in further pivotal relation to the pin 47 allows an amount of pivotal motion of the heater bar 34 with respect to the stationary bar 33 to accommodate aberrations and thicknesses of the material traveling through the sealing system.

Selection of the tension produced by pressure spring 61 in conjunction with size and operating pressure of the cylinder 50 produces a very wide range of pressure values over which the force of the bar 34 can be carefully controlled. Also, because the cylinder will react to increased pressure in the system caused by thickness increases in the material going between the belts of the system, it does allow the sealing system to accommodate a range of thicknesses of material without further adjustment. While other fluids can be used, the preferred cylinder 50 is a pneumatic or air operated cylinder to which the pressure can be varied or modulated over a wide range in a well known manner. Also, while the system has been described with respect to a single pair of heating components, a series of such pairs is also contemplated.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

I claim:

1. A heat sealing machine for sealing layers of a heat-sealable plastic film to each other, the machine comprising:

(a) a pair of flexible, endless opposed heat transfer bands each fronting each other and having a gap therebetween with a longitudinal mid-line, said bands traveling together to transport layers of film through the gap for sealing therein;

(b) at least one pair of elongate oppositely disposed heat transfer components disposed such that the components of each such pair face each other separated by confronting portions of the bands and co-extend therealong, each component of each pair having an elongate front face having a heat transfer surface positioned in a substantially vertical plane confronting a respective heat transfer band, wherein each such pair comprises a stationary heat transfer component and an adjustable heat transfer component and wherein the adjustable heat transfer component has the ability to move inwardly and outwardly laterally and pivotally in a substantially horizontal plane with respect to the corresponding stationary heat transfer component in response to forces therebetween while maintaining the angular disposition of the heat transfer surface to thereby control the pressure of sealing and thickness accommodation of layers to be sealed;

(c) constraint means for limiting the inwardly-lateral movement of the adjustable heat transfer component such that said heat transfer component does not travel beyond the longitudinal mid-line of the gap;

(d) means for applying a controllable force to urge each adjustable heat transfer component toward and in alignment with the matching stationary heat transfer component; and (e) means for adjustably positively positioning each of the adjustable heat transfer components to position and align with the corresponding stationary matching heat transfer surface of each in the desired vertical disposition.

2. A heat sealing machine as claimed in claim 1 wherein the heat transfer components are elongate heater bars.

3. A heat sealing machine as claimed in claim 2 wherein the constraint means for limiting the inwardly-lateral movement of an adjustable heater bar comprises a first flexible, non-extensible member attached near a first end of the heater bar and a second flexible, non-extensible member attached near a second end of the heater bar.

4. A heat sealing machine as claimed in claim 3 wherein the first and second flexible, non-extensible members are cables.

5. A heat sealing machine as claimed in claim 4 wherein each of the first and second cables have a travel adjustment means for adjusting the inwardly-lateral movement of the adjustable heater bar.

* * * * *